(12) United States Patent
Mattejat et al.

(10) Patent No.: US 7,097,519 B2
(45) Date of Patent: Aug. 29, 2006

(54) SPRING CONTACT SHEET AND ELECTROCHEMICAL BATTERY WITH SUCH A SPRING CONTACT SHEET

(75) Inventors: Arno Mattejat, Erlangen (DE); Aloisia Schreiber, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/101,624

(22) Filed: Apr. 7, 2005

(65) Prior Publication Data

US 2005/0233608 A1   Oct. 20, 2005

(30) Foreign Application Priority Data

Apr. 15, 2004   (EP) ................... 04008992

(51) Int. Cl.
*H01R 4/48* (2006.01)

(52) U.S. Cl. ...................... 439/862; 439/927

(58) Field of Classification Search ............ 439/862, 439/66, 927; 429/39, 38, 35
See application file for complete search history.

(56) References Cited

U.S. PATENT DOCUMENTS

| | | |
|---|---|---|
| 3,982,221 A | 9/1976 | Smith |
| 5,472,801 A | 12/1995 | Mattejat et al. |
| 6,733,303 B1 * | 5/2004 | Maldonado et al. .......... 439/66 |

FOREIGN PATENT DOCUMENTS

| | | |
|---|---|---|
| EP | 0 591 800 B1 | 3/1997 |
| JP | 01289072 | 11/1989 |
| WO | WO 97/36344 A1 | 10/1997 |
| WO | WO 02/49163 A1 | 6/2002 |

* cited by examiner

*Primary Examiner*—Javaid H. Nasri

(57) ABSTRACT

A spring contact sheet (1) for the transfer of current between two components (10,11) of an electrochemical battery (21) has a sheet (2) with a number of spring tabs (3) bent out of the plane of the sheet (8). The invention allows good spring characteristics to be achieved with a high number of contacts per unit of surface at the same time, in that at least two of the spring tabs (3a,3b) are arranged and/or formed such that the bending moments (M) generated by each of the spring tabs (3a, 3b) in the plane of the sheet (8), when a force acts on the tips of the tabs (5) in a direction perpendicular to the plane of the sheet (8), are at least partially mutually eliminated.

18 Claims, 4 Drawing Sheets

SPRING CONTACT SHEET AND ELECTROCHEMICAL BATTERY WITH SUCH A SPRING CONTACT SHEET

CROSS REFERENCE TO RELATED APPLICATIONS

This application claims priority to the European application No. 04008992.2, filed Apr. 15, 2004 and which is incorporated by reference herein in its entirety.

FIELD OF INVENTION

The invention relates to a spring contact sheet for the transfer of current between two components of an electrochemical battery, the spring contact sheet being a sheet with a number of spring tabs bent out of the plane of the sheet. Such a spring contact sheet is for example known from EP 0 591 800 B1.

BACKGROUND OF INVENTION

Electrochemical batteries, such as fuel cell batteries or electrolytic cell batteries, often comprise a plurality of components stacked one on top of the other, e.g. electrolyte/electrode units, bipolar plates, cooling cards, pole plates, pressure pads, etc. To ensure a flow of current through said stack, the surfaces of the components have to make electrical contact with each other in the direction of the stack. The current should thereby pass through with as little loss as possible and therefore on the shortest route through the stack.

Uniform electrical contact between two adjacent components however poses problems, if the distance between these components is variable. This is the case for example with pressure pads, which are arranged in fuel cell batteries at a distance of several fuel cells within the cell stack. These pressure pads are supplied with a generally electrically insulating pressure medium and are at a variable distance from their boundaries.

Such a pressure pad can for example be structured by providing a hollow space between two adjacent cooling cards or a cooling card and a pole plate of a fuel cell stack, said space being supplied with a pressure medium. A specific distance is established between the two cooling card surfaces or the pole plate and cooling card surfaces as a function of the pressure supplied and the tolerances of the components.

To ensure the flow of current through the stack, these surfaces have to make electrical contact with each other, as the pressure medium is unable to do this. A component for making contact with the surfaces of said components must therefore have a variable geometrical extension in the direction of the stack and a large number of contacts per unit of surface. It is advantageous if it can cover a large productive route, as this means that the number of pressure pads in a fuel cell stack can be kept low.

EP 0 591 800 B1 discloses a fuel cell battery, in which a spring contact sheet is arranged for the transfer of current between an electrolyte/electrode unit and an adjacent cooling card or an adjacent pressure pad. The spring contact sheet has a flat sheet making electrical contact with an electrode of the electrolyte/electrode unit and spring tabs bent out of the plane of the sheet, the tips of which make electrical contact with the cooling card.

The spring tabs are hereby bent out sharply out of the plane of the sheet and form an acute angle with the cooling card. If said spring tabs are compressed between the two adjacent battery components, the tabs bend. This mechanical load causes very high bending stresses at the base points of the spring tabs in the plane of the sheet, i.e. in the region where the spring tabs leave the plane of the sheet. If a maximum permitted stress is exceeded, this point is deformed in a plastic and irreversible manner, so that the spring characteristics are impaired. The spring tabs or spring contact sheet can therefore only be compressed to a limited degree or the height to which the springs can be bent up, is restricted by the stress ratios.

The bending stresses also result in bending of the ridges between the tabs in the plane of the sheet. In order to prevent such bending, the ridges between the spring tabs have to be relatively wide and are for example approximately the length of the spring tabs. This restricts both the spring characteristics of the spring contact sheet and the number of spring tabs and thus the number of contacts per unit of surface.

SUMMARY OF THE INVENTION

It is therefore the object of the present invention to specify a spring contact sheet, which allows substantial equalization of distance between two components at a variable distance because of its good spring characteristics and at the same time has a large number of contacts per unit of surface.

This object is achieved by the claims. Advantageous embodiments of the invention are the subject matter of the dependent claims.

The at least partially mutual elimination according to the invention of the bending moments generated in the plane of the sheet means that it is possible to a large degree to prevent torsion of the connecting ridge between the two spring tabs and the connecting ridge between the two spring tabs can thus be kept small. A large number of spring tabs can therefore be arranged in the plane of the sheet. This allows a high number of contacts on the spring contact sheet and as a result short routes for most loss-free passage possible of the current through the battery. The ridges between the spring tabs only have to be as wide as is necessary for manipulation. They are no longer necessary to maintain a counter-torque. Therefore almost all the available surface can be used for carrying current. Also smaller connecting ridges result in enhancement of the spring characteristics of the spring contact sheet.

At the same time the bending stresses at the base points of the spring tabs can be reduced due to the reduced bending moments, thereby preventing plastic and irreversible deformation. This means that the height to which the springs can be bent up and therefore also the spring path of the spring contact sheet can be increased. The smooth bearing surface of the sheet resulting from the absence of bending of the ridges allows easy assembly. The spring contact sheet can even be laid on a battery component and fixed there in an aligned manner. It then no longer moves when further components are stacked on top of it.

At least partial, ideally total, mutual elimination of the bending moments generated in the plane of the sheet is possible, if the two spring tabs have an arrangement and/or form that is symmetrical in respect of an axis perpendicular to the plane of the sheet.

According to an advantageous embodiment of the invention, the two spring tabs each have an arc shape.

If the arc shape is a circular arc shape, the points of action of the forces at the tips of the tabs move further apart, the more the springs are pressed in a direction perpendicular to the plane of the sheet. Beyond a certain force the two spring tabs touch the sheet. As the force increases, these points of contact move apart. By shortening the lever arms, this results in more uniform distribution of the bending stress and low stress levels at the base of the spring tabs. The route of the current through the spring is shortened at the same time, thereby reducing electrical resistance.

According to a particularly advantageous embodiment of the invention the arc shape is a parabolic arc shape. If the tip of a straight tab is loaded, the bending line of the spring tab follows a parabola. If the spring takes on this parabolic form, it will be straight at maximum load, without plastic deformation. A maximum spring path can thus be achieved. In contrast to the circular arc shape of the springs, the point of action of the forces at the base of the spring tabs remains unchanged. The electrical resistance of such a spring contact sheet is unchanged and is not a function of the distance through which it is compressed.

The invention and further advantageous embodiments of the invention according to the features of the subclaims are described in more detail below with reference to exemplary embodiments in the drawings. Corresponding parts are hereby referred to with the same reference characters.

DETAILED DESCRIPTION OF THE INVENTION

Figure 1:
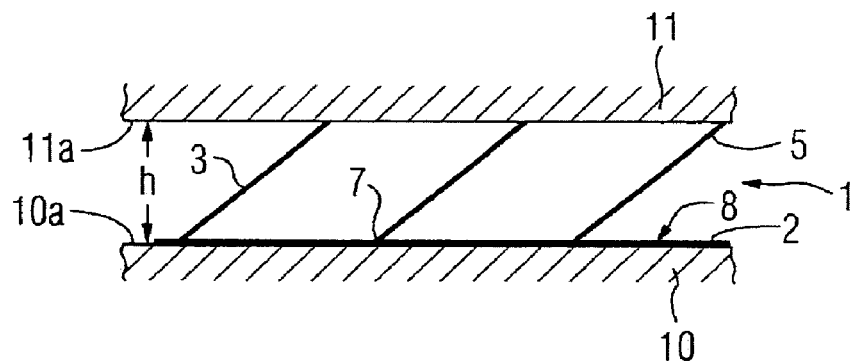
FIG. 1 shows a simplified diagram of a side view of a spring contact sheet known from the prior art.

FIG. 1 shows a simplified diagram of a spring contact sheet 1 known from the prior art for the transfer of current between two components 10 and 11 of an electrochemical battery. The current is hereby transferred via essentially flat surfaces (or boundaries) 10a, 11a, arranged parallel to each other and at variable distances from each other, of the components 10 or 11. The components 10,11 are for example planar fuel cell components, e.g. cooling cards.

The spring contact sheet 1 has a flat sheet 2 making electrical contact with the component 10 and a number of spring tabs 3 bent out of the plane of the sheet 8, the tips 5 of which tabs make electrical contact with the surface 11a of the component 11. The spring tabs 3 are bent sharply out of the plane of the sheet 8 and stand up at a uniform angle. The height h, to which the spring tabs 3 can be bent up, and therefore the bridgeable spring path or productive route, and the distances between the spring tabs and therefore the number of contacts per unit of surface 7 are restricted by the stress ratios in the base points 7 of the spring tabs 3.

Figure 2:
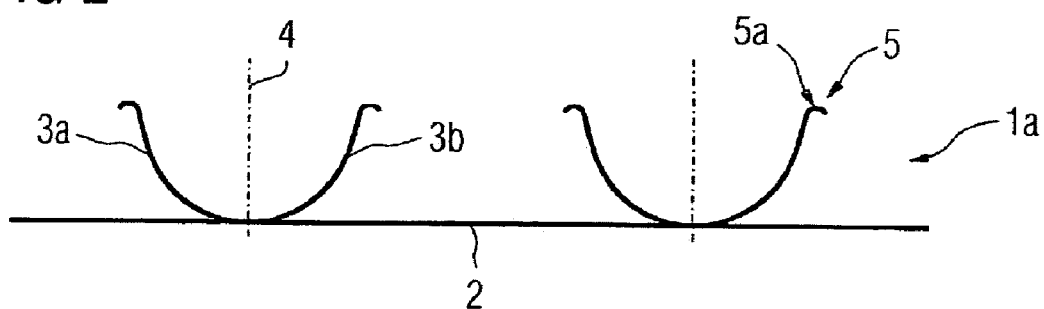
FIG. 2 shows a side view of a first embodiment of a spring contact sheet according to the invention.

FIG. 2 shows a side view of a first exemplary embodiment of a spring contact sheet 1a according to the invention. Two spring tabs 3a, 3b are arranged and formed in each instance such that, when a force acts on the tips of the tabs 5 in a direction perpendicular to the plane of the sheet 8, the bending moments generated in each instance in the plane of the sheet 8 are at least partially mutually eliminated. To this end the two spring tabs 3a, 3b have an arrangement and form that is symmetrical in relation to an axis 4 perpendicular to the plane of the sheet 8. In the exemplary embodiment shown the spring tabs 3a,3b each have a circular arc shape, i.e. the arc follows a segment of a circular arc. If the spring contact sheet is compressed between two components, the ends 5 of the spring tabs 3a,3b slide over the surface of the component on which they rest. To prevent them becoming skewed there due possibly to their own sharp edges or on surface structures or irregularities on the component with which contact is to be made, the tips of the tabs 5 are bent with a bending radius 5a.

Figure 3:
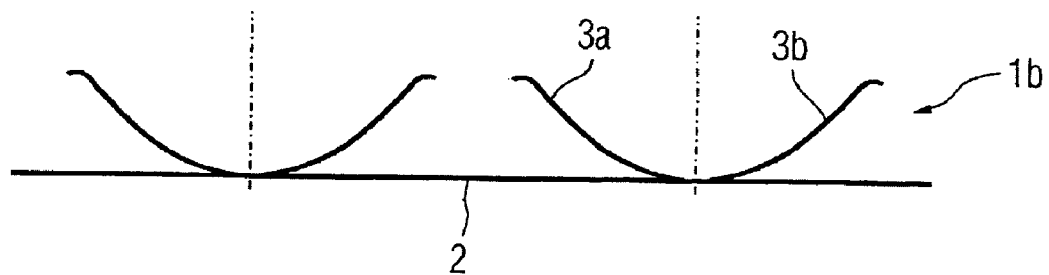
FIG. 3 shows a side view of a second embodiment of a spring contact sheet according to the invention.

A second exemplary embodiment of a spring contact sheet 1b according to the invention shown in FIG. 3 has spring tabs 3a, 3b, each having a parabolic arc shape rather than a circular arc shape.

Figure 4:
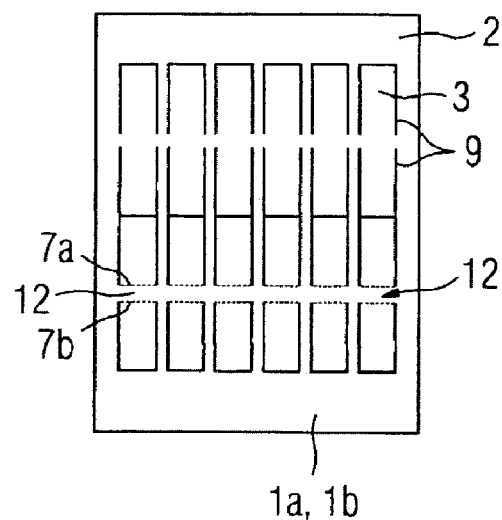
FIG. 4 shows a top view of a section of a sheet for producing a spring contact sheet according to the invention.

As shown in FIG. 4, the spring contact sheets 1a and 1b can be produced for example by cutting U-shaped or H-shaped sections 9 out of a flat sheet 2 to form tabs 3 of equal length. The base points or base lines 7a,7b (shown with a broken line) of the spring tabs are then opposite each other, as are the ends of the tabs. The narrow connecting ridges 12, between the base lines of the spring tabs, stabilize the sheet 2 for further processing stages and for assembly and installation in an electrochemical battery.

In a second work stage the spring tabs 3 can for example be bent into a circular arc or parabolic arc shape. The tips of the tabs can then be bent with a small radius.

The sheet 2 is preferably made of a material with good conductivity, e.g. a copper alloy. The surface is also at least partially provided with a surface coating with good electrical conductivity, e.g. a gold coating, which ensures little electrical transfer resistance.

At least the contact points with the battery components, with which contact is to be made, preferably have these surface coatings with good conductivity. The resistance is then still a function of contact pressure but at a very low level, which is not very perceptible in the resistance as a whole.

Figure 5:
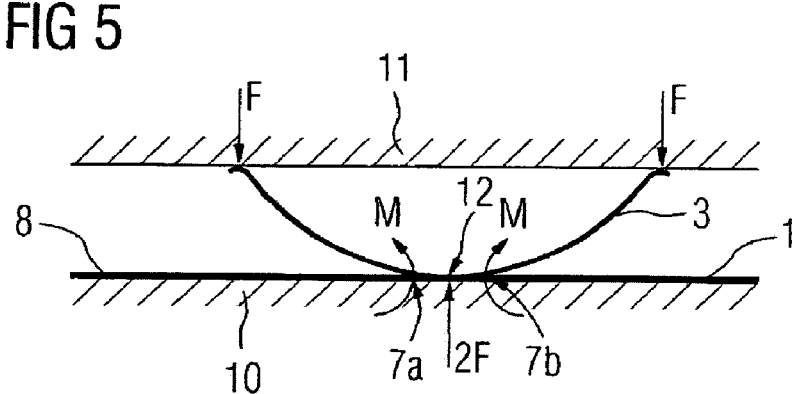
FIG. 5 shows a spring contact sheet compressed between two plate-shaped components.

FIG. 5 shows how the spring tabs 3a,3b bend, when a spring contact sheet 1 is inserted and compressed between flat parallel surfaces at a distance from each other of two components 10 and 11. The component 11 exercises a force F on the tips of the spring tabs 3a,3b respectively, while a counter-force of 2F is exercised on the sheet 2 on the part of the component 10. The arrangement and form of the spring tabs 3 are such that the bending moments M resulting due to the spring bending are equalized at the base points 7a,7b of the spring tabs 3a,3b. This means that no torque results in the plane of the sheet 8, which would twist the connecting ridge 12 between the two spring tabs 3a,3b. The plane of the sheet 8 thus remains largely in its original location and does not change position, even if the spring tabs 3a,3b are pressed quite flat.

Figure 6:
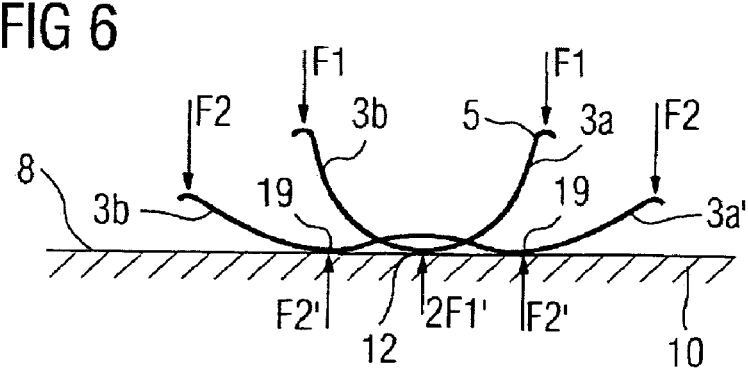
FIG. 6 shows the distribution of force in the case of spring tabs with a circular arc shape subject to the, action of different forces.

FIG. 6 shows how, in the case of spring tabs with a circular arc shape, the points of action of the forces move further apart, the more the springs are compressed. When the spring tabs 3a,3b are not compressed, the forces F1 act respectively on the tips of the tabs 5 in a direction perpendicular to the plane of the sheet 8. A counter-force 2F1' therefore acts in the connecting ridge 12 between the base points 7a,7b of the spring tabs 3a,3b. 3a' and 3b' indicate the form of the spring tabs 3a and 3b in the compressed state. Compression causes a force F2 with F2>F1 directed perpendicular to the plane of the sheet to act on the tips 5 of the spring tabs respectively. The spring tabs 3a',3b' are bent by this force such that there is contact with the sheet 2 at the contact points 19.

As the force F2 increases, the spring tabs 3a',3b' are increasingly compressed and thus increasingly bent. The increasing bending of the spring tabs 3a',3b' causes the contact points 19 to move further apart and therefore the points of action of the counter-forces F2' thus move further apart, the more the spring tabs 3 are compressed. By shortening the lever arm this results in more uniform distribution of the bending stress and lower stresses at the base of the spring tabs. When the spring tabs 3a',3b' make contact with the component 10 adjacent to the sheet 2 at the contact points, the route of the current through the spring is shortened at the same time, thereby reducing the electrical resistance.

Figure 7:
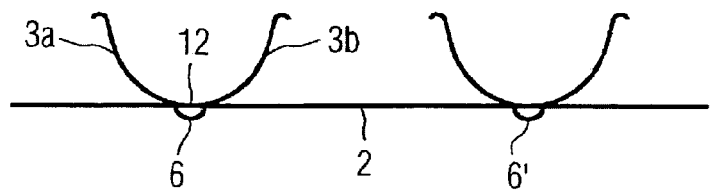
FIG. 7 shows a side view of a spring contact sheet with beads at the base points of the spring tabs.
Figure 8:
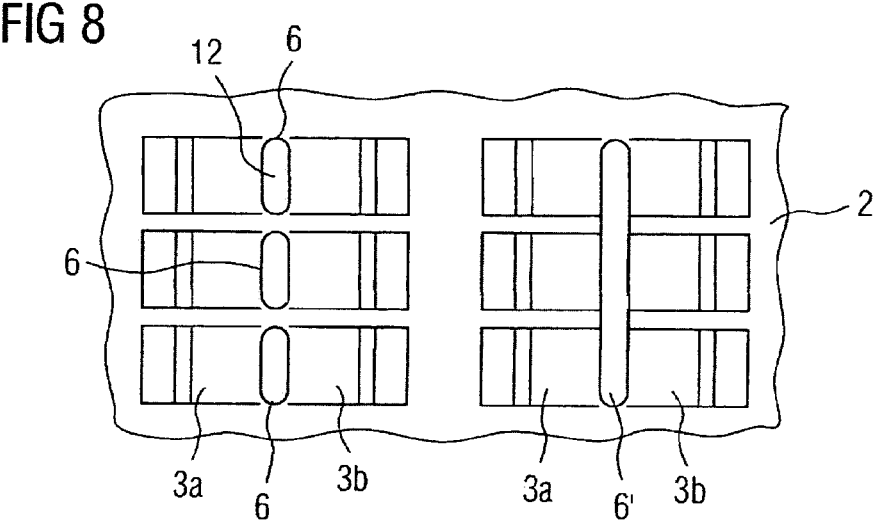
FIG. 8 shows a top view of a spring contact sheet with beads at the base points.

The connecting ridge 12 between the two spring tips 3a,3b can be smooth but it can also, as shown in side view in FIG. 7 and in top view in FIG. 8, have a recess or bead 6 or 6' on its side facing away from the spring tabs, to form contact surfaces at defined points. Such a bead can for example be molded into the sheet 2.

If the bead extends across the connecting ridges of at least two pairs of spring tabs, the respective spring tabs of which interact in respect of the bending moments generated, the sheet can also be stiffened in the direction of the bead. This can result in easier manipulation of the sheet but is also associated with a lower level of flexibility in respect of contact generation.

As shown by the top view in FIG. 8 of the spring contact sheet shown in side view in FIG. 7, in case a) a bead 6 only extends across the connecting ridge 12 of one pair of spring tabs 3a,3b in each instance, while in case b) the bead 6' extends across the connecting ridges of three pairs of spring tabs.

Figure 9:
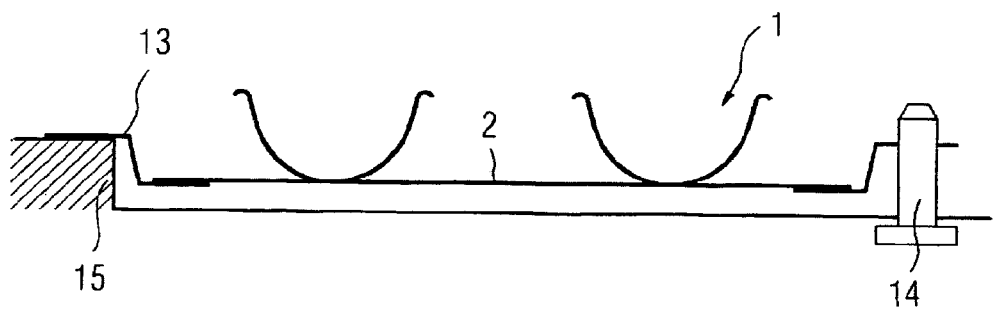
FIG. 9 shows a side view of a spring contact sheet set in a frame.

For simple assembly, the spring contact sheet 1 according to FIG. 9, can be set in a frame 13, particularly in a region, in which it does not have to carry current. This frame can be made of the same material or a different material, preferably a sealing material, in particular an elastic material. Such a frame offers the option of being aligned with edges, pins or other geometric elements, with the option of removing the fixing element from the surface carrying the current. The functions are then separated, which generally has a favorable impact on the reliability of the structure. FIG. 9 shows an example of pin centering 14 and edge centering 15.

In this manner it is also possible to sink the spring contact sheet into another component. The frame can also be used to tailor measurements between adjacent structural elements. It is then simple to use the configuration of the frame to make adaptations at the installation site.

With the same number of contacts per unit of surface, the same material and same sheet thicknesses, a spring contact sheet according to the invention allows a significantly larger spring path and-at the same time a higher contact pressure of the contact springs on a surface, with which contact is to be made, compared with the prior art. While a spring contact sheet known from the prior art with spring tabs, which are bent sharply out of the plane of the sheet, when using CuBe and a sheet thickness of 0.2 mm, for example only allows a spring height of 2 mm in the uncompressed state, it being possible to compress the spring tabs without plastic deformation only by approx. 1 mm to a height of 1 mm, a spring contact sheet according to the invention with the same number of contacts, sheet thickness and material can be configured with a spring height of 5 mm (uncompressed), it being possible to compress the spring tabs without essential plastic deformation up to a spring height of 0.5 mm, so that a spring path of 4.5 mm can be bridged.

Figure 10:
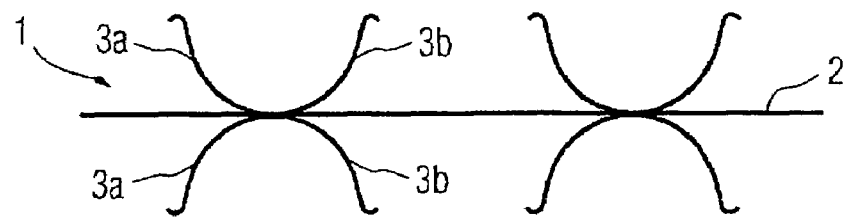
FIG. 10 shows a side view of a spring contact sheet with spring tips bent out of the plane of the sheet on both sides.
Figure 11:
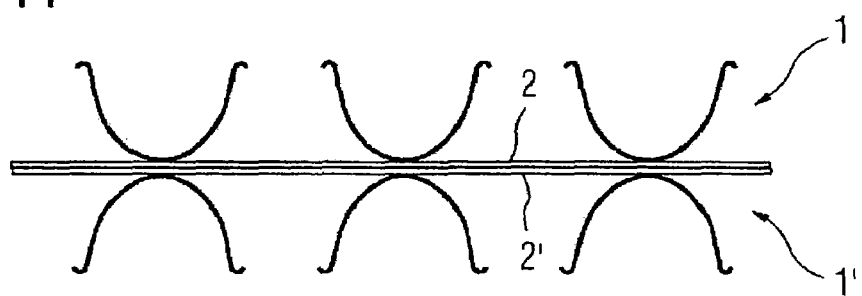
FIG. 11 shows a side view of two spring contact sheets with their flat sheets adjacent to each other.

It is possible to double the bridging distance by bending spring tabs 3a,3b out of both sides of the plane of the sheet 2 (see FIG. 10). Alternatively according to FIG. 11, the sheets 2,2' of two spring contact sheets 1,1' can also be laid adjacent to each other, thereby doubling the bridging distance. Such components are also easy to assemble, as during compression the spring tabs slide in two opposing directions. The resulting sliding forces are of equal size but counter to each other. The components therefore remain essentially in their positions.

Figure 12:
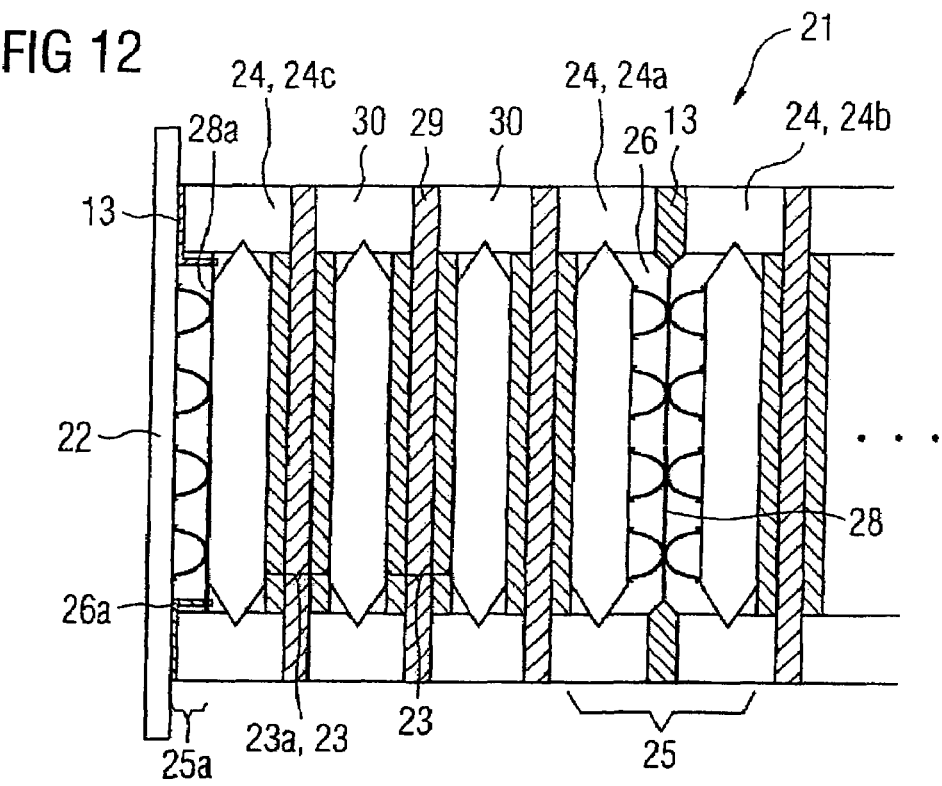
FIG. 12 shows a longitudinal section of a fuel cell battery with spring contact sheets for the transfer of current between battery components.

The spring contact sheet according to the invention is particularly suitable for the transfer of current between two plate-shaped or planar components, arranged parallel to each other, of electrochemical batteries, in particular fuel cell batteries, such as electrolytic cell batteries. FIG. 12 shows a simplified diagram of a longitudinal section through part of a fuel cell battery 21. The battery 21 comprises a first pole plate 22, a second pole plate at a parallel distance from this (not shown) and a number of electrolyte/electrode units 23 arranged between these. A cooling card 24 is arranged respectively between two of the electrolyte/electrode units 23, also referred to as membrane electrode assemblies (MEA) and each comprising carbon papers, catalyst layers and a membrane, and between an external electrolyte/electrode unit 23 and the adjacent pole plate 22. A cooling card refers to any type of welded or otherwise formed plate, which forms a hollow space for a cooling medium. They can for example be twin plates, one on top of the other, joined together along the edges in a sealing manner and set in a frame. Cooling cards can have openings for receiving and discharging cooling medium. Cooling cards also typically function at the same time as bipolar plates in a fuel cell stack.

Cooling cards 24 are made from thin sheets, which due to their material thickness and geometric structure can easily be deformed, and are easily tailored to height differences between adjacent components, i.e. the membrane electrode assemblies 23 including gas spaces (not shown in more detail) or the pole plates 22.

One of the electrolyte/electrode units 23 is removed from the stack in the battery 21, forming a hollow space 26 in its place. A pressure pad 25 is formed by applying pressure to this hollow space 26 with any medium. The pressure in the hollow space 26 is higher than the pressures in the adjacent gas and cooling water spaces, so that the hollow space 26 is pushed apart and the adjacent spaces are compressed. A pressure pad 25a with only one cooling card 24c, but otherwise the same structure, is directly adjacent to the pole plate 22.

The cooling plates 24a and 24b facing each other in the hollow space 26 are thus at a variable distance from each other, which is a function of the tolerances of the components arranged between the pressure pads, the spring characteristics of said components, if they can be deformed by pressure, and the level of pressure exercised by the medium in the pressure pad 25. The same applies to the distance between the cooling plate 24c and the pole plate 22.

To transfer current between the cooling cards 24a and 24b, a spring contact sheet 28 with spring tabs bent out of the plane of the sheet on both sides is arranged in the hollow space 26, said sheet being set in a frame 13, which seals the hollow space 26 externally. To this end the frame can be made of an elastic sealing material. If the cooling cards adjacent to the frame themselves already have an elastic sealing material at the contact points with the frame 13, the frame can also be made of a hard material, preferably a metal, e.g. in the form of a metal foil.

The spring contact sheet 28 is preferably set in a frame 13, the external form and/or dimensions of which is/are identical to those of the electrolyte or membrane component 29 of the battery 21. In this case the frame 13 can be used to tailor the dimensions of the sealing elements 30, sealing the membrane 29. The pressure space 28 can then be produced in a simple manner by replacing an electrolyte/electrode unit 23 in the fuel cell stack with a spring contact sheet 28 set in a frame 13.

In the case of the pressure space 28a between the pole plate 22 and the cooling card 24c, to transfer current between these two components a spring contact sheet 28a is provided with spring tabs bent out of the plane of the sheet on one side only. The sheet of the spring contact sheet 28a on the one hand makes contact with the cooling card 24 and the spring tabs on the other hand make contact with the pole plate 22.

The configuration of the frame 13 can be used for simple adaptation of a spring contact sheet at the installation site. A smooth frame can for example be provided for assembly on smooth pole plates, while a graduated frame can be provided for assembly within a fuel cell stack. The form and arrangement of the springs thereby allow a structure to be achieved, which, in addition to the main task of carrying current, also has a whole series of other favorable characteristics. As a result the spring contact sheet can be used in a variety of manners and is simple to assemble.

The invention claimed is:

1. A spring contact sheet for the transfer of current between two components of an electrochemical battery, comprising:
   a plurality of spring tabs formed integral with the sheet and bent out of a plane of the sheet,
   wherein at least two of the spring tabs are arranged and/or formed on a same side of said sheet and are joined by a common connecting ridge such that bending moments generated by each of the spring tabs in the plane of the sheet, when a force acts on tips of the tabs in a direction perpendicular to the plane of the sheet, are at least partially mutually eliminated.

2. The spring contact sheet according to claim 1, wherein the two spring tabs have an arrangement and/or form that is symmetrical in respect of an axis perpendicular to the plane of the sheet.

3. The spring contact sheet according to claim 2, wherein the two spring tabs each have an arc shape.

4. The spring contact sheet according to claim 3, wherein the arc shape is a circular arc shape.

5. The spring contact sheet according to claim 3, wherein the arc shape is a parabolic arc shape.

6. The spring contact sheet according to claim 1, wherein the tips of the tabs are bent.

7. A spring contact sheet for the transfer of current between two components of an electrochemical battery, comprising:
   a plurality of spring tabs bent out of a plane of the sheet and integral with the sheet,
   wherein at least two of the spring tabs are arranged and/or formed on a same side of said sheet and are joined by a common connecting ridge such that bending moments generated by each of the spring tabs in the plane of the sheet, when a force acts on the tips of the tabs in a direction perpendicular to the plane of the sheet, are at least partially mutually eliminated; and
   wherein a connecting ridge arranged in the plane of the sheet between base points of the two spring tabs have a bead on the side facing away from the spring tabs.

8. The spring contact sheet according to claim 7, wherein the bead extends across the connecting ridge of at least two pairs of spring tabs, the respective spring tabs of which interact in respect of the bending moments generated.

9. The spring contact sheet according to claim 1, wherein the spring contact sheet comprises a surface provided at least partially with a surface coating with good electrical conductivity.

10. The spring contact sheet according to claim 1, wherein the spring contact sheet is set in a frame.

11. The spring contact sheet according to claim 10, wherein the frame is made of a sealing material.

12. The spring contact sheet according to claim 11, wherein the sealing material is elastic.

13. The spring contact sheet according to claim 10, wherein the frame is made of a metal.

14. An electrochemical battery, comprising:
   two battery components; and
   at least one spring contact sheet arranged between the two battery components for the transfer of current between the two battery components,
   wherein the spring contact sheet comprises a plurality of spring tabs formed integral with the sheet and bent out of a plane of the sheet,
   wherein at least two of the spring tabs are arranged and/or formed on a same side of said sheet and are joined by a common connecting ridge such that bending moments generated by each of the spring tabs in the plane of the sheet, when a force acts on tips of the tabs in a direction perpendicular to the plane of the sheet, are at least partially mutually eliminated.

15. The battery according to claim 14, wherein the two battery components are each configured as cooling cards.

16. The battery according to claim 14, wherein one of the two components is configured as a cooling card and the other of the two components is configured as a pole plate.

17. The battery according to claim 14, wherein the spring contact sheet is set in a frame, wherein an external form and/or external dimensions of the frame are identical to those of an electrolyte component of the battery.

18. The battery according to claim 14, wherein the battery is a fuel cell battery or an electrolytic cell battery.

* * * * *